United States Patent Office 3,276,089
Patented Oct. 4, 1966

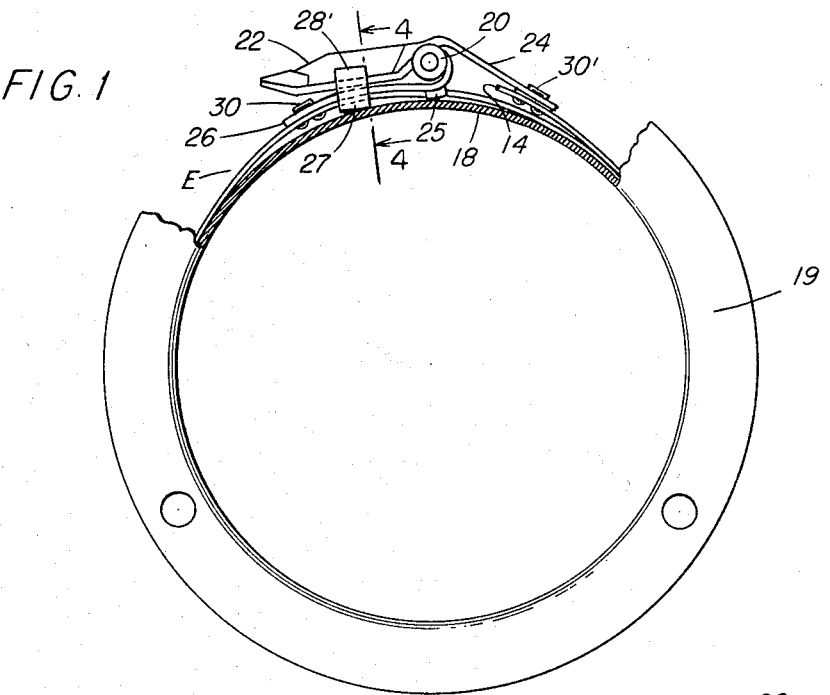
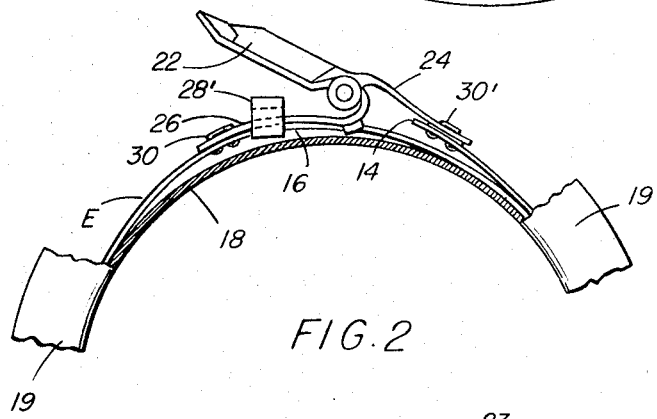
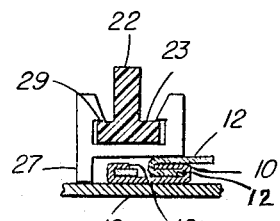
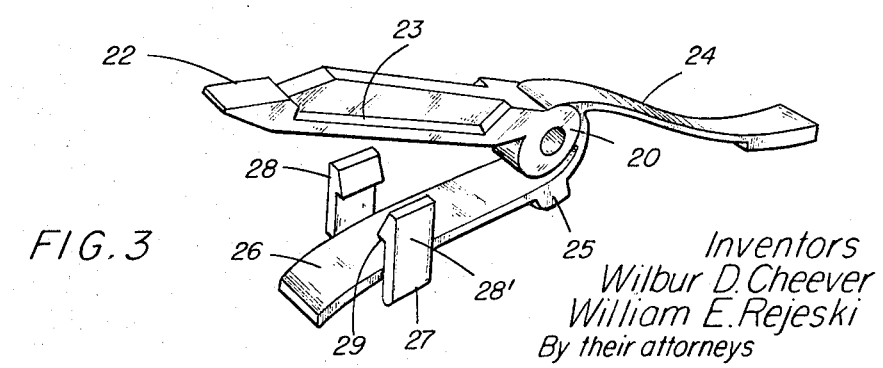

3,276,089
CLAMP FOR FLEXIBLE TUBING
Wilbur D. Cheever, Wethersfield, and William E. Rejeski, Farmington, Conn., assignors to The Wiremold Company, West Hartford, Conn., a corporation of Connecticut
Filed Aug. 24, 1964, Ser. No. 391,546
5 Claims. (Cl. 24—270)

This invention relates to devices for clamping collapsible two-element tubing to connecting means of various types including, but not limited to, adapter rings, flanges, conduits, tube ends, pipe ends and, in fact, any circular generally cylindrical or elliptical shape of conduit or connection. More particularly, the invention relates to a clamp adapted to be secured to the end convolution of two-element tubing of the type having a flexible strip of coated or uncoated fabric, plastic material or other flexible material between and secured to adjacent convolutions of a resilient helix of metal or other common suitable material.

Various efforts have been made heretofore to produce an inexpensive reliable clamp which could be secured to the end convolution of two-element tubing of the above-mentioned type and which would, in combination with said convolution, produce a clamping arrangement integral with the tubing so that the tubing could be securely clamped to a conduit or other connection, connector or device.

Some of these prior clamps have gone into use and achieved some success, but efforts have continued to produce a more effective, less expensive, sturdier, more reliable clamp.

Therefore, it is an object of this invention to provide a clamp member which may be applied to the end convolution of collapsible two-element tubing quickly, securely and inexpensively and which has a minimum number of inexpensive readily manufactured parts.

Another object of the invention is to provide a clamp member of the above type which may be attached to two-element tubing wherein the clamp member is formed in on piece from synthetic plastic or other similar suitable material.

Another object of the invention is to provide a one-piece clamp member which may be attached to the end convolution of two-element tubing as aforsaid, in which th clamp member itself has a minimum number of parts or limbs and which has provision for latching the clamp in position by pressure in one direction to hold the end convolution of the two-element tubing around the device or member to which it is to be connected. A related object is to provide a latch which can be released when desired and which is of simple form.

Other objects and advantages of the invention will become apparent as it is described in connection with the accompanying drawing.

In the drawing:

FIG. 1 is an end view, partly in section, of a clamp attached to two-element tubing and applied to a flange or connector ring.

FIG. 2 is a fragmentary view on an enlarged scale of the clamp, connector ring and two-element tubing showing the clamp in open-position.

FIG. 3 is a perspective view of the clamp member by itself before being attached to the collapsible tubing.

FIG. 4 is a transverse section view taken along line 4—4 of FIG. 1.

The invention will be described in connection with a type of collapsible two-element tubing with which it is particularly useful. The invention is adaptable to use, nevertheless, with other conduits and tubing where a need exists to clamp the end of the tubing or conduit to another device, flange, pipe, connecting ring or the like.

In the drawing, the collapsible tubing of the type described in the A. E. Shernack Patent 2,417,676 is shown, being formed of a helical metal strip of resilient sheet metal with its edges folded over onto the edges of a flexible strip or tape made of woven fabric (coated or uncoated), thin synthetic plastic material or the like so that opposite edges of the metallic strip frictionally grip and clamp the adjacent edges of the convoltuions of the flexible strip. Such tubing is formed continuously and when severed, leaves its end metal convolution E with an extremity 14 cut substantially axially of the tubing, the beginning of said end convolution being indicated by the numeral 16. The end convolution of the tubing is shown in FIG. 1 as clamped onto the cylindrical portion 18 of an annular fitting, connecting ring or flange having a radial flange portion 19 turned out from a cylindrical portion.

For clamping the end convolution of the tubing onto the ring portion 18, a one-piece clamp member, as illustrtaed in FIG. 3, is provided. It may be made of synthetic plastic material such as nylon, for example, or of any other suitable material. Tough flexible easily worked or molded materials are preferable, but the invention is not limited to any particular composition or material.

The clamp comprises a cylindrical hub portion 20 from the periphery of which extend, tangentially or radially, at different points a lever portion 22, a tension portion 24 and a connector portion 26. The tension portion 24 extends in the opposite direction from the lever portion 22 while the connector portion 26 extends downwardly beneath the tension portion and has its inner or connecting end wrapped around the hub portion for a small distance so that its body portion extends in substantially the opposite direction from the tension portion, but on the opposite side of the hub portion 20.

The connecting portion 26 has its free end attached to the beginning 16 of the end convolution E of the metallic strip of the tubing by a staple, rivet or other suitable permanent securing means 30. Likewise, the tension portion 24 has its free end secured by a staple 30′ to the extremity 14 of the end convolution E of the metallic strip. For that purpose, the end of the tension portion may be made thicker than the body of the tension portion.

As shown in FIG. 2, when the clamp is attached to the metal convolution, the lever portion 22 extends from the hub portion 20 oppositely to and in substantial alignment with the tension portion 24; and when the lever portion is bent down, as in FIG. 1, it overlies the connector portion 26. The lever portion being integral with the hub portion 20, causes the hub portion 20 to roll on its connection to the connector portion 26 as the lever is pressed toward the connector portion. This rolling pulls the tension portion 24 along as the lever and hub move, thus applying tension to the tension portion and, in turn, pulling the extremity 14 of the end convolution of the metallic strip. This contracts the circumference and diameter of the end convolution. Such contraction causes the end convolution of the tubing to clamp tightly against and around the cylindrical portion 18 of the ring 19 (or any other conduit connector or device around the outside of which the tubing may be fitted).

To hold the lever portion down close to the connector portion 26 and to maintain said claimping action, the lever portion 22 is cut back into its opposite side faces toward its top face providing ledges 23 running lengthwise of the lever portion adjacent its lower or innermost face. To engage these ledges, a pair of parallel oppositely facing latch arms 28, 28′ are provided extending upwardly from the connector portion 26 away from the tubing at opposite edges of the connector portion. Each latch arm has an upwardly tapered end from an inwardly directed shoulder 29.

Due to the clamp being made of resilient material, the latch arms 28, 28' are flexible enough to be moved outwardly as the lever portion 22 is pushed down. Hence, as the lever portion 22 is pressed down from the position of FIGS. 2 and 3 to the position of FIG. 1, the lever portion preses apart the latch arms 28, 28' as it engages their tapered ends, until the shoulders 29 align with the ledges 23 whereupon the latch arms snap inwardly and hold the lever down in the clamping position of the clamp member. To release the clamp (only rarely desired), it is only necessary to press the arms 28, 28' apart to disengage the shoulders 29 from the ledges 23. The lever portion 22 will then move upwardly or away from the metallic convolution of the tubing due to the bias exerted by the tendency of the tubing to expand circumferentially.

When collapsible tubing is cut, the folded-over edge of the flexible strip is cut off adjacent the outer folded-over edge 10' of the metallic strip, leaving the inner folded-over edge of the flexible strip 12 overlying the inner folded-over edge 10' of the metallic strip. Also, the extremity of the end convolution of the metal strip (before the clamp is secured to it) is spaced from the adjacent convolution of the metal strip as far as the flexible strip will permit the two to move apart under normal expansive action of the tubing. But, when the clamp is secured at one end by staple 30' to the extremity 14 or the end convolution of the metal strip and is secured at the other end by staple 30 to the beginning 16 of the end metal strip convolution, the extremity 14 is drawn laterally toward the beginning 16 of the metal convolution. This results in the connector portion 26 joining the beginning of the end metal convolution at an angle instead of in exact register and alignment. Hence, one edge of the clamp overhangs the edge of the metal convolution. In consequence, when pressure is exerted on the lever portion 22, the clamp tends to tilt.

To compesate for this and to provide support at the edge of the clamp as the lever portion 22 is pressed down, a lug 25 is formed on the outer edge of the connector portion adjacent the hub portion 20 extending generally radially inward with respect to the tubing. For a similar reason, a lug 27 is formed as an extension of latch arm 28' radially inwardly with respect to the tubing axis. These lugs 25 and 27 engage the cylindrical part 18 of the flange or conduit as the lever portion 22 is depressed after the end of collapsible tubing has been slipped over and around the cylindrical part 18. Thus, lugs support the clamp as the lever portion is depressed.

The invention is not limited to the precise positioning of the tension portion, the connector portion and the lever portion around the hub or to the precise direction of their tangential or radial extension. It is only essential that when the lever portion is pressed down toward the connector portion, the pivoting action of the lever portion and rolling action of the hub portion shall cause tension to be applied to the tension portion and, thus, to cause the contraction of the metallic convolution of the tubing as above described.

From the foregoing, it will be apparent that the invention provides a clamp member which may be formed as one piece by casting, molding, shaping or in any suitable manner from nylon or other synthetic plastic material or any other suitable material possessing the necessary characteristics and attributes of toughness, pliability and low cost and which is not brittle, but may be attached to the metal convolution of two-element tubing without danger of cracking or breaking. The clamp provided according to the invention may be attached to the two-element tubing in simple inexpensive manner by riveting or stapling with readily accessible tools, to provide in combination with the convolution of the tubing a clamping arrangement whereby the end of a length of collapsible tubing may be connected to and clamped to a connector ring, conduit end, end of piping or any other connection to which it may be desirable to have the tubing connected.

Due to the fact that the clamping member is made in one piece from the raw material, assembly costs are minimal and the danger of losing parts of the clamp is eliminated while at the same time the clamp can be applied with utmost ease to the end convolution of the tubing.

Modifications within the scope of the invention will occur to those skilled in the art. Therefore, the invention is not limited to the specific form of the embodiment illustrated and described.

What is claimed is:

1. In combination with collapsible tubing of the type which includes a helically wound resilient element, one-piece clamping means for contracting a convolution of said helical element comprising a connector portion affixed to the convolution at one point, a tension portion affixed to said convolution at another point, a lever portion adapted to be moved to contract the periphery of said convolution, and latching means for holding said lever portion in contracting position, said latching means and said portions all being integral with one another and formed of flexible resilient material.

2. The combination as claimed in claim 1, wherein the clamping means has a hub portion from which the others of said portions extend, at least one of said portions tending to wrap around said hub portion as said lever portion is moved into said contracting position.

3. The combination as claimed in claim 1 having means extending inwardly of the tubing from said clamping means to support the same in substantial parallelism to said convolution at least at one point where the clamping means overhangs said convolution.

4. A unitary clamping element made in one piece for use with tubing, comprising a hub portion, a tension portion extending from said hub portion adapted to be secured to the tubing, a connector portion extending from said hub portion and adapted to be secured to the tubing at a point spaced from said tension portion, and a lever portion extending from said hub portion and movable to draw closer to each other the points of said tension and connector portions at which they are secured to the tubing, and latching means formed integrally with at least one of said portions to hold said lever portion in the position wherein said points are drawn closest.

5. A unitary clamping element as claimed in claim 4 wherein said hub portion is generally cylindrical and adapted to roll as said lever portion is depressed, said rolling causing said tension portion to move with said hub portion and relative to said connector portion.

References Cited by the Examiner

UNITED STATES PATENTS

| | | | |
|---|---|---|---|
| 645,780 | 3/1900 | Bennett | 138—99 |
| 892,197 | 6/1908 | Umpleby et al. | 24—273 |
| 1,324,927 | 12/1919 | Robinson | 24—271 |
| 2,482,558 | 9/1949 | Scaringella | 285—409 X |
| 2,654,926 | 10/1953 | Delafosse | 24—68 X |
| 2,804,095 | 8/1957 | Schauenburg | 285—409 X |

WILLIAM FELDMAN, *Primary Examiner.*

D. GRIFFIN, *Assistant Examiner.*